United States Patent
Larmuseau et al.

(10) Patent No.: US 11,283,836 B2
(45) Date of Patent: Mar. 22, 2022

(54) AUTOMATIC DECOY DERIVATION THROUGH PATCH TRANSFORMATION

(71) Applicant: Carrier Corporation, Palm Beach Gardens, FL (US)

(72) Inventors: Adriaan Larmuseau, Shanghai (CN); Devu Manikantan Shila, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 462 days.

(21) Appl. No.: 16/264,038

(22) Filed: Jan. 31, 2019

(65) Prior Publication Data

US 2019/0238593 A1   Aug. 1, 2019

(30) Foreign Application Priority Data

Jan. 31, 2018   (CN) .......................... 201810099701.3

(51) Int. Cl.
| | |
|---|---|
| *H04L 29/06* | (2006.01) |
| *G06F 8/65* | (2018.01) |
| *G06F 8/40* | (2018.01) |
| *G06F 21/57* | (2013.01) |
| *G06N 20/00* | (2019.01) |

(52) U.S. Cl.
CPC ............... *H04L 63/20* (2013.01); *G06F 8/40* (2013.01); *G06F 8/65* (2013.01); *G06F 21/57* (2013.01); *H04L 63/1425* (2013.01); *H04L 63/1433* (2013.01); *H04L 63/1441* (2013.01); *H04L 63/1491* (2013.01); *G06N 20/00* (2019.01)

(58) Field of Classification Search
CPC ... G06F 8/65; G06F 21/57; G06F 8/40; H04L 63/1425; H04L 63/20; H04L 63/1433; H04L 63/1491; H04L 63/1441; G06N 20/00
See application file for complete search history.

(56) References Cited

U.S. PATENT DOCUMENTS

| | | |
|---|---|---|
| 7,647,637 B2 | 1/2010 | Schuba |
| 8,037,529 B1 | 10/2011 | Chiueh et al. |
| 8,171,544 B2 | 5/2012 | Black et al. |
| 8,453,245 B2 | 5/2013 | Rogers et al. |
| 8,528,086 B1 | 9/2013 | Aziz |
| 8,613,096 B2 | 12/2013 | Peinado et al. |
| 8,769,687 B2 | 7/2014 | Hoefelmeyer et al. |
| 8,869,133 B2 | 10/2014 | Alls et al. |

(Continued)

OTHER PUBLICATIONS

Araujo, Frederico, et al., "From Patches to Honey-Patches", Computer and Communicaitons Security, ACM, Nov. 3, 2014, 11 pages.

(Continued)

*Primary Examiner* — Nelson S. Giddins
*Assistant Examiner* — Shu Chun Gao
(74) *Attorney, Agent, or Firm* — Cantor Colburn LLP (57) ABSTRACT

A method and system for implementing security patches on a computer system is disclosed. The method includes finding one or more security patches; analyzing one of the one or more security patches to find one or more localized security fixes within the one or more security patches; and transforming a security patch within the one or more security patches into a honey patch that is configured to report security violations.

16 Claims, 6 Drawing Sheets

(56) References Cited

U.S. PATENT DOCUMENTS

| | | | |
|---|---|---|---|
| 9,118,709 | B2 | 8/2015 | Oliphant et al. |
| 9,286,469 | B2 | 3/2016 | Kraemer et al. |
| 9,553,886 | B2 | 1/2017 | Touboul et al. |
| 9,594,549 | B2 | 3/2017 | Hey et al. |
| 2007/0044153 | A1* | 2/2007 | Schuba .............. H04L 63/1433 726/24 |
| 2007/0240138 | A1* | 10/2007 | Chess ................ G06F 11/3612 717/143 |
| 2007/0271614 | A1 | 11/2007 | Capalik |
| 2015/0047032 | A1 | 2/2015 | Hannis et al. |
| 2016/0080415 | A1 | 3/2016 | Wu et al. |
| 2016/0323301 | A1* | 11/2016 | Boss .................... G06F 21/554 |
| 2017/0024642 | A1* | 1/2017 | Xiong ................... G06N 3/084 |
| 2021/0011985 | A1* | 1/2021 | Korotaev ............... G06F 21/126 |
| 2021/0026949 | A1* | 1/2021 | Korotaev ................. G06F 8/71 |

OTHER PUBLICATIONS

European Search Report for application EP 19154447.7, dated Jun. 11, 2019, 22 pages.

* cited by examiner

FIG. 1

```
+++ usr.sbin/bind/lib/dns/openssllink.c
@@ -133,7 +133,7 @@
         if (status == 0)
-        if (errnum <= 0)
+            return (dst__openssl_toresult(DST_R_VERIFYFAILURE));
```

FIG. 2A

```
If:
  BinaryOp: ==
    ID: status
    Constant: int, 0
  Return:
    FuncCall:
      ID: dst__openssl_toresult
      ExprList:
        ID: DST_R_VERIFYFAILURE
```

FIG. 2B

```
If:
  BinaryOp: <=
    ID: status
    Constant: int, 0
  Return:
    FuncCall:
      ID: dst__openssl_toresult
      ExprList:
        ID: DST_R_VERIFYFAILURE
```

FIG. 2C

```
 : if (data_size < sizeof(uint32_t) || (*c)+(data_size) > blen)
 : :     return EINVAL;
 : if (data_size < sizeof(uint32_t) || *c+data_size > blen ||
 +     SIZE_T_OVERFLOW(*c, data_size)) return EINVAL;
```

FIG. 3A

```
+ int HONEY_0 = 0, HONEY_1 = 0, HONEY_2 = 0;
+ HONEY_0 = data_size < sizeof(uint32_t);
+ if(!HONEY_0) HONEY_1 = ((*c) + data_size) > blen;
+ if((!HONEY_0) || (!HONEY_1)) HONEY_2 = SIZE_T_OVERFLOW(*c, data_size);
+ if((HONEY_0 || (!HONEY_1) || (HONEY_2))){
+     alert_honey_activies();
+     return EINVAL;
+ }
```

FIG. 3B

```
if (size > (R_MAX - R_RX_BUFO - rxbase) * 4) {
    D(qemu_log("etralite packet is too big, size=%x\n", size));
    return -1;
}
memcpy(&s->regs[rxbase + R_RX_BUFO], buf, size);
+ + + +
```

FIG. 4A

```
if (size > (R_MAX - R_RX_BUFO - rxbase) * 4) {
    alert_bump_service();
    D(qemu_log("etralite packet is too big, size=%x\n", size));
    return -1;
}
memcpy(&s->regs[rxbase + R_RX_BUFO], buf, size);
+ + + +
```

AUTOMATIC DECOY DERIVATION THROUGH PATCH TRANSFORMATION

FOREIGN PRIORITY

This application claims priority to Chinese Patent Application No. 201810099701.3, filed Jan. 31, 2018, and all the benefits accruing therefrom under 35 U.S.C. § 119, the contents of which in its entirety are herein incorporated by reference.

BACKGROUND

Exemplary embodiments pertain to the art of computing. In particular, the present disclosure relates to a method and system for improving security in a computer system through the use of patch transformation.

Computing systems are increasingly prevalent in today's society. Computing systems are often connected to other computers, forming networks of computers. These can be local computers forming local networks, or distant networks, such as the Internet. An issue with connected computing system is that hackers and other bad actors often attempt to exploit security flaws that may exist in computing systems.

BRIEF DESCRIPTION

According to one embodiment, a method for implementing security patches on a computer system is disclosed. The method includes finding one or more security patches; analyzing one of the one or more security patches to find one or more localized security fixes within the one or more security patches; and transforming a security patch within the one or more security patches into a honey patch that is configured to report security violations.

According to one embodiment, a system for implementing security patches on a computer system is disclosed. A system includes a processor and a memory. The processor is configured to perform a method. The method includes finding one or more security patches; analyzing one of the one or more security patches to find one or more localized security fixes within the one or more security patches; and transforming a security patch within the one or more security patches into a honey patch that is configured to report security violations.

In addition to one or more features described above, or as an alternative, further embodiments may include wherein analyzing one of the one or more security patches comprises analyzing source code of the one or more security patches to identify sections of the source code for a security fix.

In addition to features described above, or as an alternative, further embodiments may include wherein transforming the security patch comprises adding source code that calls an alert service.

In addition to features described above, or as an alternative, further embodiments may include compiling the honey patch to create a decoy system configured to detect a presence of attackers within the computer system.

In addition to features described above, or as an alternative, further embodiments may include wherein analyzing known security patches comprises converting source code into abstract syntax trees to determine changes of the security patch.

In addition to features described above, or as an alternative, further embodiments may include wherein training the computer system by analyzing known security patches to determine characteristics of security patches.

In addition to features described above, or as an alternative, further embodiments may include wherein characteristics of security patches include keywords that correlate with security patches.

In addition to features described above, or as an alternative, further embodiments may include wherein characteristics of security patches include commonly used functions that correlate with security patches.

In addition to features described above, or as an alternative, further embodiments may include wherein training the computer system comprises assigning weights to one or more of the following characteristics: variable and function names; type casts; logical and mathematical operators; function calls; variable assignments; and "return" and "goto" statements.

In addition to features described above, or as an alternative, further embodiments may include wherein training the computer system comprises a simple Bayes learning phase and a fix pattern learning phase.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, computing systems can have vulnerabilities that are attacked by hackers and other bad actors.

Vulnerabilities can come in a variety of different manners, such as viruses, Trojan horses, worms, and the like. In many instances, a flaw is detected in an operating system, application, or other piece of software. The flaw may lead to the vulnerability. The vendor of the affected software will then issue a "patch." A patch modifies the software and will hopefully eliminate the vulnerability. There are other reasons for a vendor to release a patch, such as to add a new feature or fix "bugs" that do not result in system vulnerabilities (e.g., errors in the user interface.)

There are several issues with patches. Some computer systems are not regularly updated. Systems that did not load a particular patch could be susceptible to the vulnerabilities. Another issue is the "zero day" vulnerability. There is time between a vulnerability being discovered and a patch being issued. During that time period (called zero day), all systems are susceptible to the vulnerability, even systems that are typically updated as soon as patches are released.

In one or more embodiments, security fixing patches are received as input. The output is a "honey patch." When the honey patch installed on a computer system, the computer system is protected, but the resulting machine is a "decoy machine." A decoy machine can detect the presence of attackers in computer networks. The decoy systems are derived from the patches to detect the vulnerability. Thereafter, systems are changed to decoy systems to intercept attempted attacks and inform system administrators of the presence of attacks.

To present additional background, a computer system runs software applications and programs. Sometimes, vulnerabilities are found in the software that can be exploited. An attacker may deploy "malware" in the form of a virus, Trojan horse, worm, or the like. While some malware can have a small effect, other malware can be very damaging, as they could lead to serious security flaws that allow an attacker to access sensitive information or even take control of a computer system.

A software patch is a computer program that modifies an existing program. While some patches are for items such as new features or capabilities of the computer program, other patches (sometimes called security patches, bug fixes, and various other names) are specifically intended to prevent a specific vulnerability or a general vulnerability that could be exploited in multiple different manners.

Ideally, a user will regularly install software patches. Installing a security patch will prevent attackers from exploiting the vulnerability on a particular computer system. However, it has been found that many users do not regularly install software patches. For example, a data breach report conducted in 2016 found that three of the top ten exploited vulnerabilities in the year 2015 originated in the year 2002, meaning there are many systems that have not been patched in over decade.

An additional problem that exists with late adoption of patches is that attackers are able to reverse engineer patches. For example, some patches fix vulnerabilities that were never publicized. Thus, an attacker can analyze a patch to develop exploits that could work on unpatched systems.

Figure 4A:
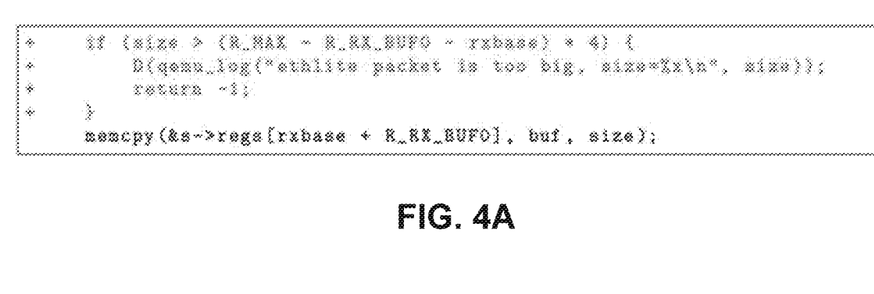
FIG. 4A is pseudocode of an exemplary patch.
Figure 4B:
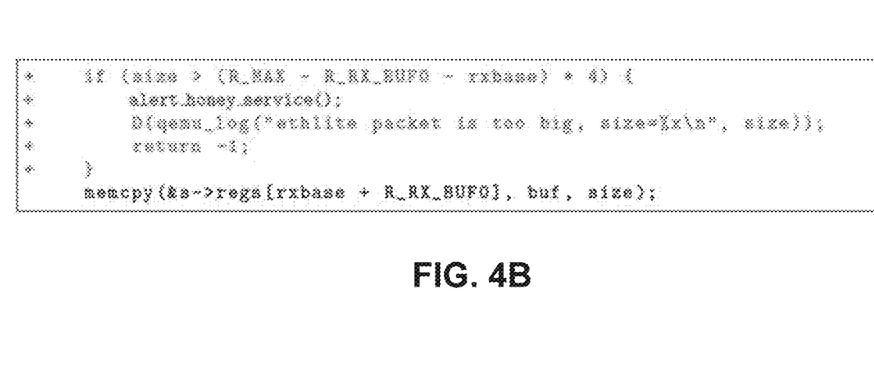
FIG. 4B is pseudocode of an exemplary honey patch version of the exemplary patch.

Exemplary pseudocode illustrating the result of operation of an embodiment on an exemplary code segment is presented in FIGS. 4A and 4B. In FIG. 4A, pseudo code of an original security patch is illustrated. The plus signs to the left of each line indicate a new line of code added by the patch. In this particular case, a vulnerability existed with respect to a heap overflow. The patch added three lines of code to check for the overflow and present a warning.

In FIG. 4B, the "honey patch" is illustrated. The honey patch version is a modified version of the patch. This exemplary honey patch adds a call to an alert service. When compiled, the result is a "decoy" system. The decoy system is patched, but alerts other systems in the network as to the existence of an attack on the network.

It should be understood that the pseudocode of FIGS. 4A and 4B present a relatively simple case. Some security patches are much more complex than a single if-then statement. For example, there could be various complex modifications to a Boolean condition. In such a case, an embodiment might not be able to simply insert a line to call an alert service, because of the possibility of false triggering when a security vulnerability is not present. In such a case, the Boolean conditions can be decompiled such that the side effects and original intent of the code are maintained, but the alert service is triggered when a security vulnerability is actually found. In another example, if patch includes replacing an insecure application program interface (API) with a more secure API, then an embodiment might not insert new code. Instead, common secure API functions can be replaced with a honey patched version of the API functions.

Figure 1:
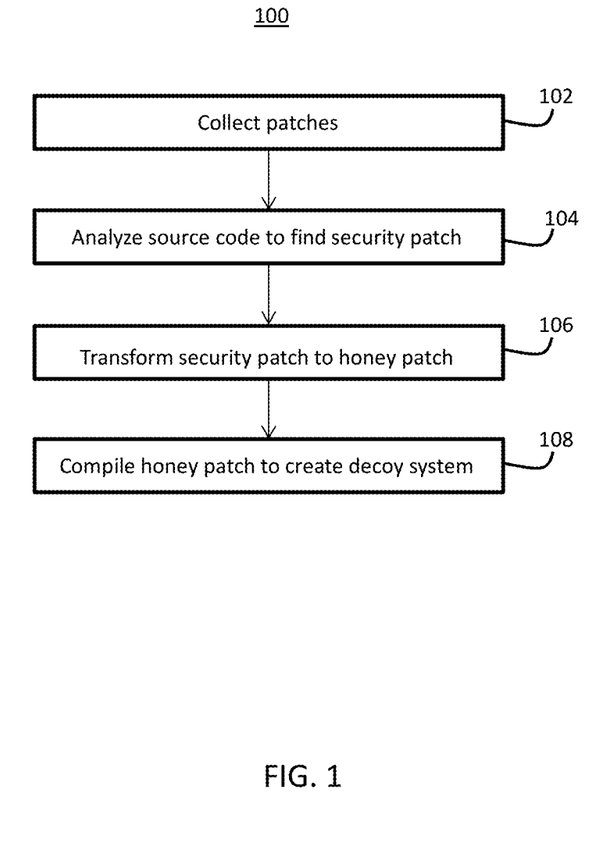
FIG. 1 is a flowchart illustrating the operation of one or more embodiments.

With respect to FIG. 1, a method 100 is presented that illustrates the generation of the honey patch in one or more embodiments. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined, skipped, or performed in a different order.

Method 100 demonstrates the operation of the "auto honey" system that automatically generates honey patches to transform a system into a decoy system. At block 102, patches are collected. This can involve the use of webcrawlers that search through common targets for patches for multiple software applications, such as the National Vulnerability Database, revisions posted on Github, and the security errata published for notable open source projects. The number of sources being crawled can be adjusted based on how many sources are desired to be analyzed.

In some embodiments, the patches that are crawled are the source code versions of the patch. In some embodiments, binary files (also known as executables) can be crawled and subjected to a decompiling procedure to generate source code. In some embodiments, the patches can be limited to those that are of one or more specific programming languages (such as C, C++, C#, PHP, Java, and the like).

At block 104, the source code is analyzed to determine the vulnerability being fixed by the patch. As discussed above, a patch is not necessarily limited to security issues. A patch also may be related to new features, user interfaces changes, non-security related bug fixes, and the like. The analysis is geared towards determining whether or not a patch contains a security fix. In some embodiments, a support vector machine can be used to analyze the source code of each patch. The support vector machine uses machine-learning techniques to analyze the source code of each patch. This can involve the use of an abstract syntax tree representation of the patched and unpatched source code.

This model can be trained in a supervised off-line training mode. During the training mode, source code of known security patches is input to a system. The system analyzes the source code of known security patches and learns to classify patch snippets based on the features extracted from the patches within the training set.

Figure 2A:
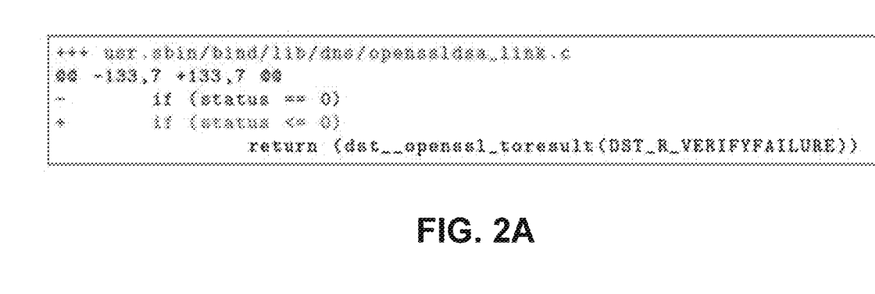
FIG. 2A is pseudocode of an exemplary unpatched portion of code.
Figure 2B:
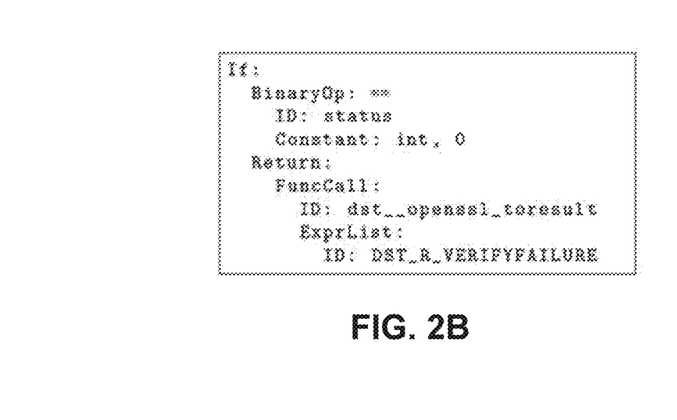
FIG. 2B is an abstract syntax tree of the exemplary unpatched portion of code.
Figure 2C:
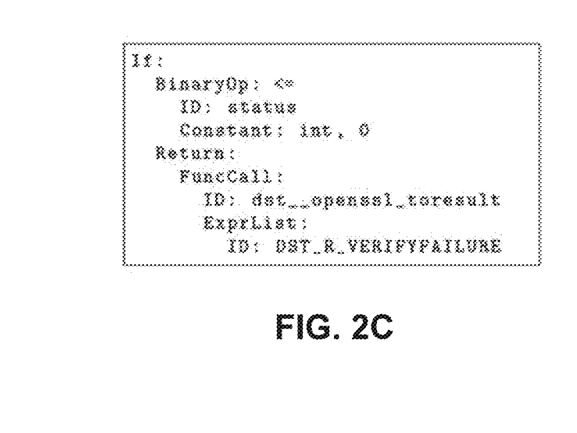
FIG. 2C is an abstract syntax tree of an exemplary patched portion of source code.

The use of an abstract syntax tree representation is presented in FIGS. 2A through 2C. Unpatched version of the source code is presented in FIG. 2A. In this patch, the if-then statement is changed from looking for a certain status being equal (the line of code preceded by a minus sign) to zero to determining if the status is less than or equal to zero (the line of code preceded by a plus sign). This is converted to an abstract syntax tree (AST). The AST describes the source code using a tree based data structure. The AST of the unpatched source code is presented in FIG. 2B. An AST of the patched source code is also created in FIG. 2C.

In some instances, a patch might only contain limited snippets of code that might not be capable of being compiled. In such a case, a system can attempt to make the code compilable by closing open braces, inserting missing type and function definitions and so forth. Once the corrected snippet of code is converted into an AST format, those additions are removed to avoid misdirecting the learning model.

For the training mode, AST may only be generated for the source code that is denoted as being within the input patch, as opposed to the entire software system. In such a manner, an analysis of the entire source code of the software in question is not needed.

The training mode can be considered to have two phases. The first phase is a simple-Bayes learning phase. Bayesian filters are trained to analyze keywords in the identifiers of security patches that correlate with security fixes. Thereafter, a dataset is constructed of secure and insecure library functions.

Analyzing keywords involves analyzing variable names and function names to extract insights from security patches. It has been found that many developers provide their variables with meaningful names that capture the use and purpose of the variables within the source code. During this phase, the system will extract contiguous substrings of all variable and function names that appear within the patches of the training set. Bayesian filters are used on the extracted substrings to determine whether or not the substring appears in a security fixing context. For example, it has been found that substrings "offs" and "buff" are more likely to appear in the "if" statements of patches than outside of the security patches.

The second phase is called the fix-pattern learning phase. The system extracts from the compiled AST the syntactical features of control flow statements to learn patterns within security fixes. For example, many modern software programs use standard and third-party libraries to perform certain functions. Some vulnerabilities are due to security flaws within the library. Functions that are removed and functions that are added are analyzed to determine relationships between secure and insecure functions. Thus, some fixes involve the removal or replacement of insecure functions, parameters, APIs, and frameworks.

Associations between functions can be tracked. For example, pairs of functions that are added or removed within 5 lines of each other can be considered associated function pairs. It might be found that functions called "sprintf" and "strlen" are removed while a function called "snprintf" is added. This can be interpreted as "sprintf" and "strlen" both being related to "snprintf". If found in the training set, this could inform a system that functions with those names are indicative of a security patch.

The fix-pattern learning phase also can include distinguishing between a security fix that captures explicitly insecure states from fixes that do not. Various factors can be used to make this distinction, including the following: variable and function names; type casts; logical and mathematical operators; function calls; variable assignments; and "return" and "goto" statements. During training, the system assigns weights to these extracted features. In other words, based on an analysis of the training set of patches, the system will learn which features are indicative of a security patch and which are indicative of a non-security patch.

For example, certain operators may be more likely to appear in a security patch than other operators, such as comparative operators (<= or >=) being more common than mathematical operators (/ or *). Certain function names may be more likely to appear in a security patch for reasons set forth above. Variable assignments may be used to repair overflow issues (for example, setting a variable to a certain amount if it is over that amount). Return statements can include common error handling practices, such as "return −1".

When analyzing Boolean conditions, the analysis determines if the Boolean condition became more restrictive (harder to satisfy) or less restrictive. If a patch is less restrictive, then that could be indicative of handling additional error states. This can be accomplished by converting the earlier created AST representation into an associative expression tree. This more abstract representation ensures that the system only extracts modifications from Boolean conditions that alter the behavior of the program, improving the preciseness of the learned model.

Once the patched and unpatched Boolean conditions are converted into associative trees, a modification extractor will attempt to compute the overlap between both trees, ignoring the order of appearance of the leafs and nodes. To compute this overlap, the modification extractor assumes that all variables and functions that appear in both the unpatched and patched Boolean conditions have the same logical behavior unless changes to them appeared previously within the patch. After computing the overlap between both Boolean conditions, the subsets of the patched and unpatched Boolean conditions that are not contained within the overlap are extracted as the modifications.

At block 106, the security patch is transformed into a honey patch. After the relevant security portions of the patches are identified, additional code is added that handles the vulnerability that was patched.

There are two main methods for transforming a security patch into a honey patch: 1) API call replacement; and 2) control flow statement extension.

The three most common security fixes are: 1) replacing unbounded copying with bounded copying; 2) replacing unbounded concatenation with bounded concatenation; and 3) replacing printing functions with bounded printing functions. For each of the above fixes, a honey patch triggers an alert service when the bound is violated. These replacement functions capture the exploitation of the vulnerability that existed previously, when the library functions were unbounded.

Figure 3A:
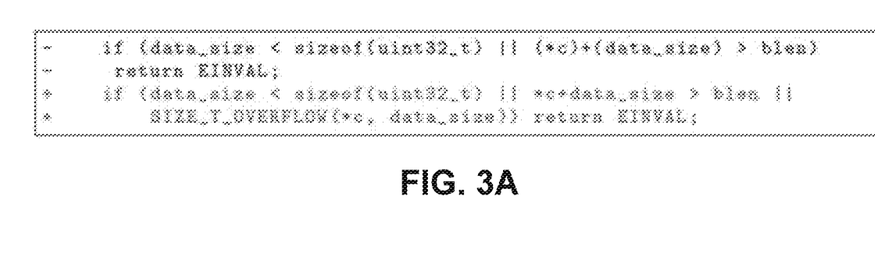
FIG. 3A is pseudocode of an exemplary patch.
Figure 3B:
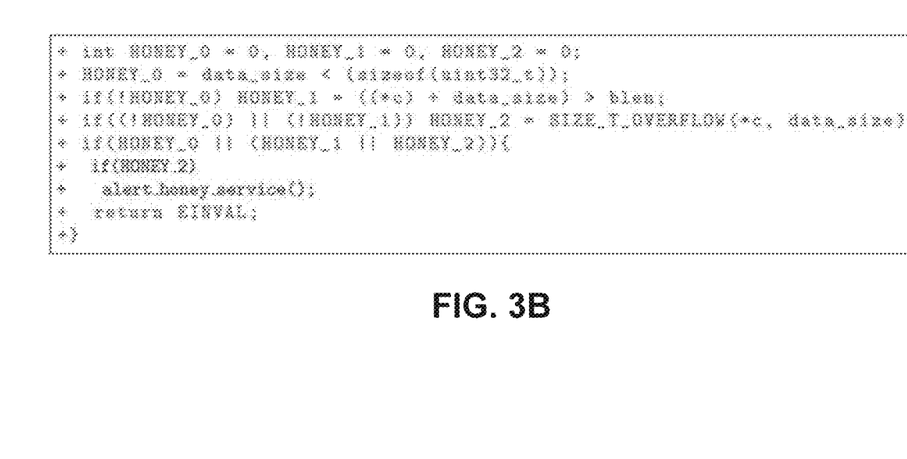
FIG. 3B is pseudocode of an exemplary honey patch version of the exemplary patch.

An exemplary pseudocode illustrating this process is presented in FIGS. 3A and 3B. In FIG. 3A, the security patch is presented. The old code (preceded by a minus sign) determines if the size of certain data is used to create a return value. The new code (preceded by a plus sign) performs the same steps, but also checks for an overflow. Presumably, the security problem was related to an overflow condition that was not checked for in the old code.

In FIG. 3B, the honey patch version of the code is presented. The honey patch adds an additional header that contains the implementation of the honey replacement functions. In addition, it renames the security fixing functions calls in the appropriate places. It decompiles the original logical expression into variables, then uses the variables to check for the security relevant conditions, without triggering any side-effects.

In this example, the patched condition is less restricted than the unpatched condition. The patched condition evaluates to true when the function SIZE_T_OVERFLOW(*c, data_size) evaluates to true. However, this behavior does not exist in the unpatched condition.

To accurately detect the previously existing vulnerability is thus to test the Boolean value of SIZE_T_OVERFLOW (*c, data_size). Merely checking the modified statements before triggering the alert service might not work if the SIZE_T_OVERFLOW function has side effects that alter its behavior when executed.

Therefore, an embodiment decompiles the Boolean condition of the control flow statement into individual logical values that are evaluated in the same order as the original condition. This decompilation allows an embodiment to check that the modification that fixes the security flaw applies by simply testing the appropriate logical values instead of executing the original statements. This ensures that no conditional statement is executed twice, ensuring that honey patches do not alter the observable behavior of the program.

In FIG. 3B, the original conditional statement is compiled into three different variables HONEY_0, HONEY_1, and HONEY_2.

With respect to control flow statement extension, one or more embodiments localize control flow statements in a patch that are likely security fixes. The learned model is applied to the features extracted from the patches. The localized control flow statements together with their feature vector are input into an embodiment to be extended into honey patches. If a patch added a control flow statement, the honey patch merely adds an additional line of code that calls the alert service.

Referring back to FIG. 1, block 108 compiles the honey patch to create a decoy system. It should be remembered that a purpose of an embodiment is not to patch a mission critical system, but rather it is meant to create a disposable "decoy" system. The decoy system serves to detect the presence of attackers within a particular network, through the attacker's attempts at exploiting vulnerabilities.

Figure 5:
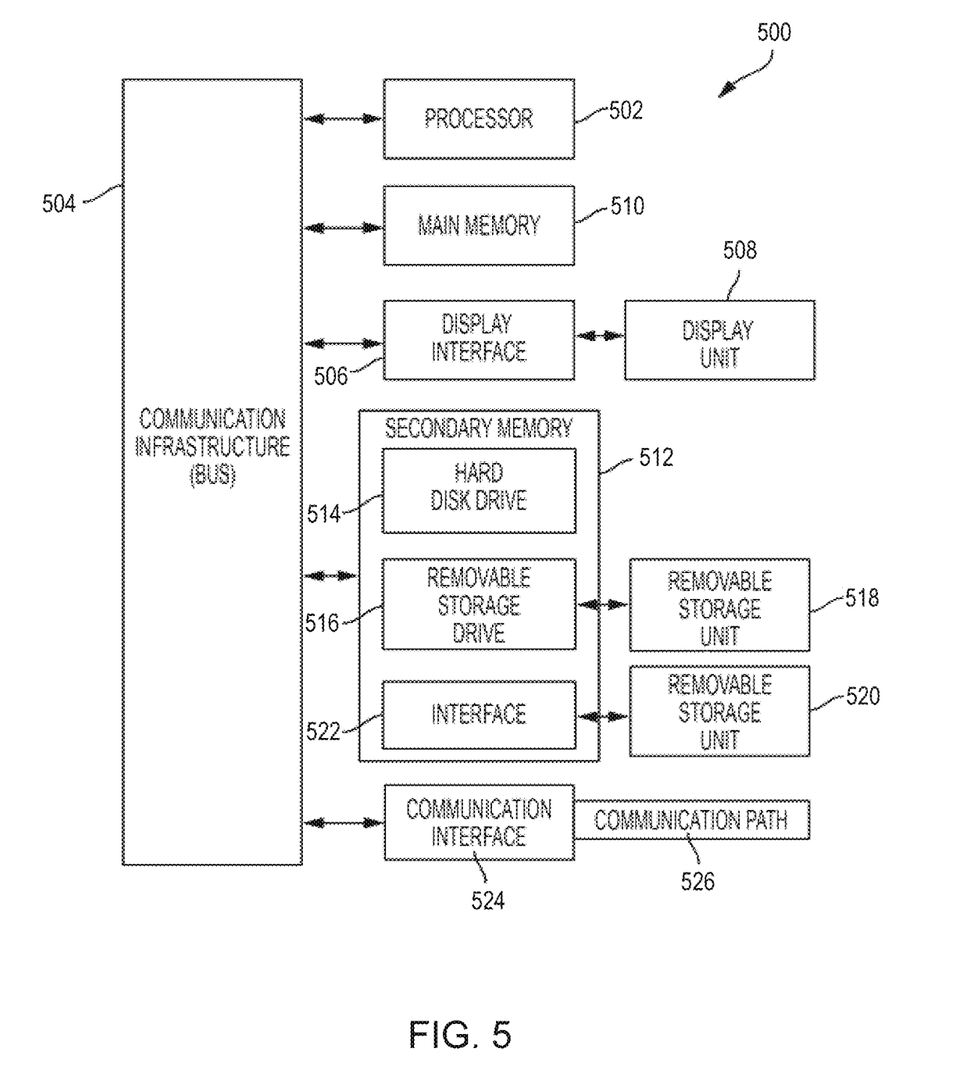
FIG. 5 is a block diagram illustrating an exemplary computer system.

FIG. 5 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them. While numerous components are illustrated in FIG. 5, some embodiments might not include every illustrated component.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
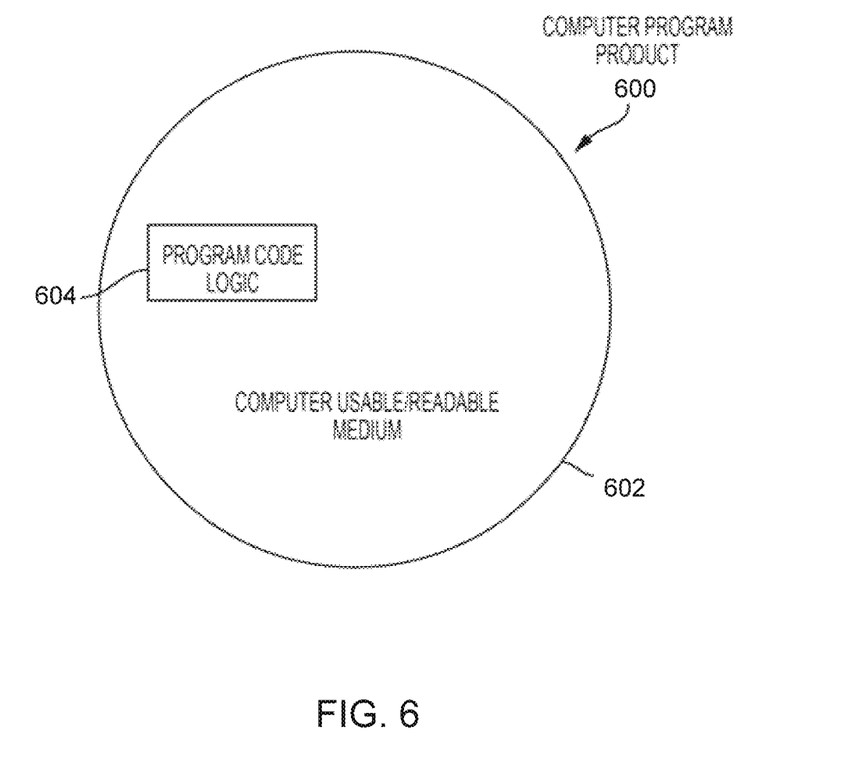
FIG. 6 illustrates a computer program product.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for implementing security patches on a computer system comprising:
   training the computer system to determine characteristics of security patches by analyzing known security patches;
   finding one or more security patches;
   analyzing, in response to the training, one of the one or more security patches to find one or more localized security fixing patches within the one or more security patches; and
   transforming the security fixing patch within the one or more security patches into a honey patch that is configured to report security violations; and
   compiling the honey patch to create a decoy system configured to detect a presence of attackers within the computer system, the decoy system alerting a system in the network as to the existence of an attack on the network.

2. The computer-implemented method of claim 1, wherein:
   analyzing one of the one or more security patches comprises analyzing source code of the one or more security patches to identify sections of the source code for a security fix.

3. The computer-implemented method of claim 2, wherein:
   transforming the security patch comprises adding source code that calls an alert service.

4. The computer-implemented method of claim 2, wherein:
   analyzing known security patches comprises converting source code into abstract syntax trees to determine changes of the security patch.

5. The computer-implemented method of claim 1, wherein:
   characteristics of security patches include keywords that correlate with security patches.

6. The computer-implemented method of claim 1, wherein:
   characteristics of security patches include commonly used functions that correlate with security patches.

7. The computer-implemented method of claim 1, wherein:

training the computer system comprises assigning weights to one or more of the following characteristics: variable and function names; type casts; logical and mathematical operators; function calls; variable assignments; and "return" and "goto" statements.

8. The computer-implemented method of claim 1, wherein:
training the computer system comprises a simple Bayes learning phase and a fix pattern learning phase.

9. A computer system comprising:
a processor; and
memory;
wherein the processor is configured to perform the method comprising:
training the computer system to determine characteristics of security patches by analyzing known security patches;
finding one or more security patches;
analyzing, in response to the training, one of the one or more security patches to find one or more localized security fixing patches within the one or more security patches; and
transforming the security fixing patch within the one or more security patches into a honey patch that is configured to report security violations;
compiling the honey patch to create a decoy system configured to detect a presence of attackers within the computer system, the decoy system alerting a system in the network as to the existence of an attack on the network.

10. The computer system of claim 9, wherein:
analyzing one of the one or more security patches comprises analyzing source code of the one or more security patches to identify sections of the source code for a security fix.

11. The computer system of claim 10, wherein:
transforming the security patch comprises adding source code that calls an alert service.

12. The computer system of claim 10, wherein:
analyzing known security patches comprises converting source code into abstract syntax trees to determine changes of the security patch.

13. The computer system of claim 9, wherein:
characteristics of security patches include keywords that correlate with security patches.

14. The computer system of claim 9, wherein:
characteristics of security patches include commonly used functions that correlate with security patches.

15. The computer system of claim 9, wherein:
training the computer system comprises assigning weights to one or more of the following characteristics: variable and function names; type casts; logical and mathematical operators; function calls; variable assignments; and "return" and "goto" statements.

16. The computer system of claim 9, wherein:
training the computer system comprises a simple Bayes learning phase and a fix pattern learning phase.

* * * * *